(12) United States Patent
Venable et al.

(10) Patent No.: US 6,292,168 B1
(45) Date of Patent: Sep. 18, 2001

(54) PERIOD-BASED BIT CONVERSION METHOD AND APPARATUS FOR DIGITAL IMAGE PROCESSING

(75) Inventors: Dennis L. Venable, Marion; Patrick A. Fleckenstein, Jr.; William A. Fuss, both of Rochester, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/133,565

(22) Filed: Aug. 13, 1998

(51) Int. Cl.$^7$ ........................................ G09G 5/04
(52) U.S. Cl. ..................... 345/153; 345/155; 382/244
(58) Field of Search ........................... 345/132, 153, 345/154, 155, 152, 190; 382/244, 245, 246, 247, 1.2, 41; 341/50–56, 63, 2; G09G 1/02

(56) References Cited

U.S. PATENT DOCUMENTS

| | | | | |
|---|---|---|---|---|
| 4,236,228 | * | 11/1980 | Nagashima | 365/114 |
| 4,663,729 | * | 5/1987 | Matick | 364/900 |
| 4,689,807 | * | 8/1987 | Maan | 377/57 |
| 5,319,395 | * | 6/1994 | Larky | 345/190 |
| 5,390,262 | * | 2/1995 | Pope | 382/41 |
| 5,604,527 | * | 2/1997 | Ng | 347/240 |
| 5,854,620 | * | 12/1998 | Mills | 345/153 |
| 5,943,040 | * | 8/1999 | Rice | 345/154 |
| 5,995,122 | * | 11/1999 | Hsieh | 345/523 |
| 6,009,191 | * | 12/1999 | Julier | 382/166 |
| 6,020,897 | * | 2/2000 | Carlsen | 345/435 |
| 6,038,576 | * | 3/2000 | Ulichney | 708/208 |

* cited by examiner

*Primary Examiner*—Matthew Luu
*Assistant Examiner*—Wesner Sajous
(74) *Attorney, Agent, or Firm*—Fay, Sharpe, Fagan, Minnich & McKee, LLP

(57) ABSTRACT

A period-based method for converting digital image data for a plurality of pixels from a first bit depth to a second bit depth includes receiving an input scanline of an arbitrary length comprising digital image data for a plurality of input image pixels. Each of the input image pixels is defined at the first bit depth. The input scanline is divided into a plurality of periods each comprising digital image data for a select number of input image pixels. The period is selected so that the image data for the select number of input image pixels exactly comprises m bytes when defined at the first bit depth and exactly comprises n bytes when defined at the second bit depth, wherein m and n are different integers. For each of the periods in succession, the image data for each of the select number of input image pixels is converted from the first bit depth to the second bit depth. A code generator generates hard-coded conversion operating instructions and a look-up table for specified bit conversion operations and generic conversion operating instructions for all other bit conversion operations.

13 Claims, 6 Drawing Sheets

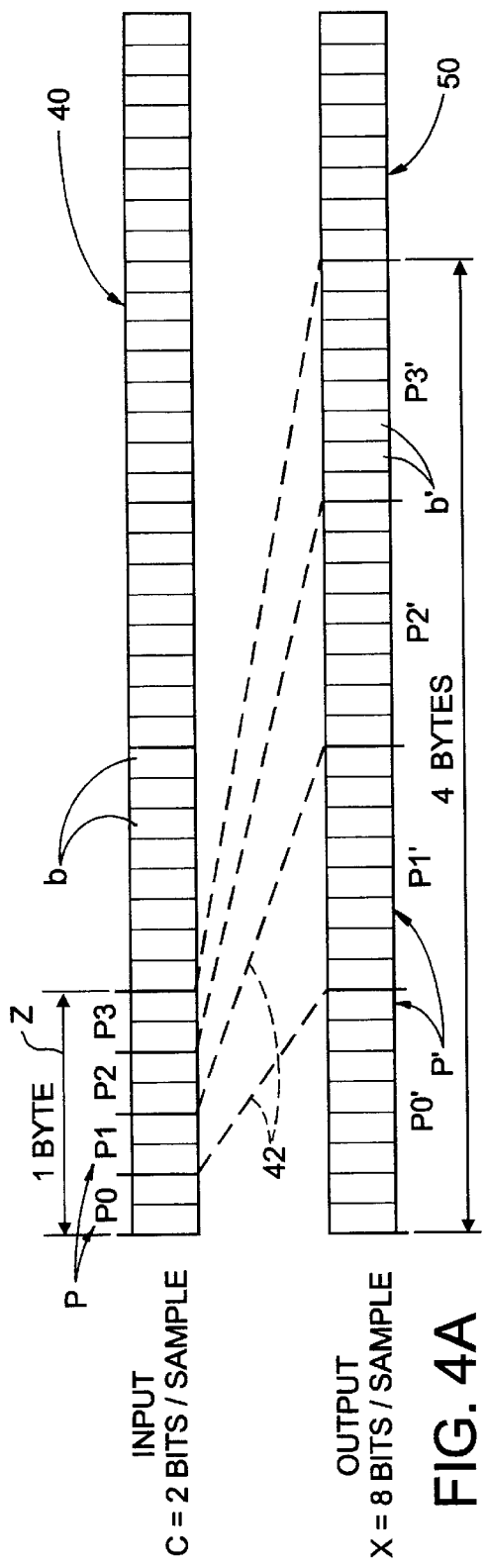
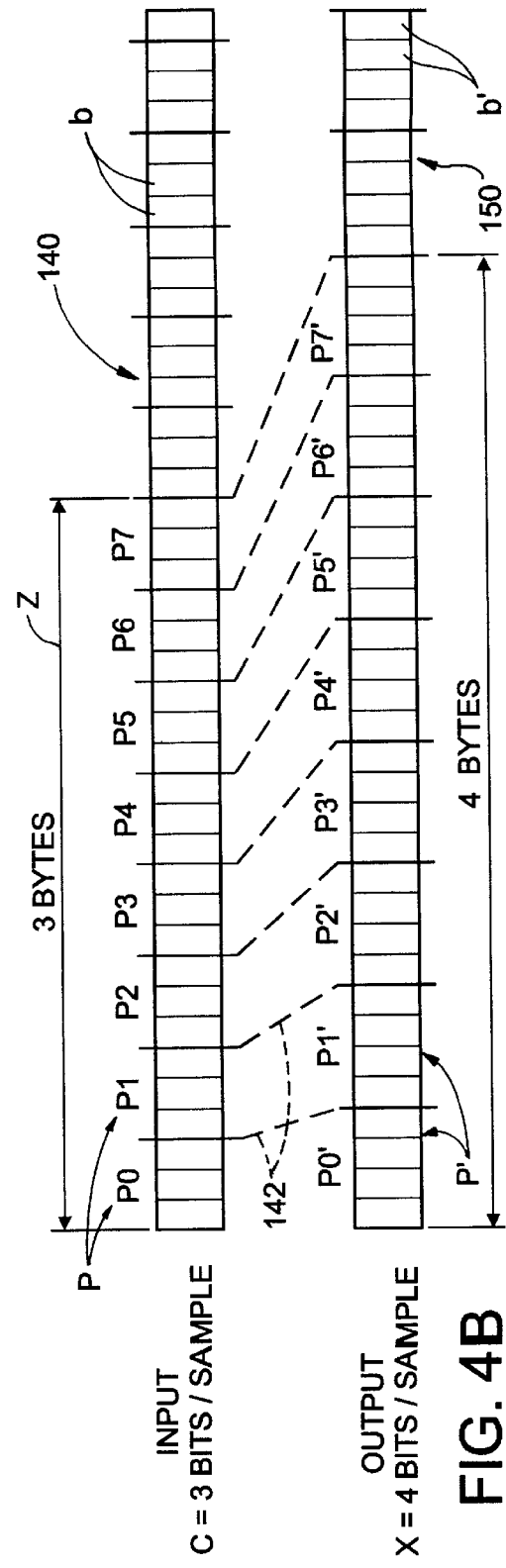
FIG. 4A
FIG. 4B

PERIOD-BASED BIT CONVERSION METHOD AND APPARATUS FOR DIGITAL IMAGE PROCESSING

BACKGROUND OF THE INVENTION

This application relates to the digital image processing arts. More particularly, the application relates to a method and apparatus for converting image data from a first bit depth (number of bits per sample) to a second bit depth as required for different image processing modules or operations in an image processing system.

Traditionally, digital image files were created with a variety of bit depths or number of bits per sample (i.e., bits per pixel for monochromatic image data or bits per separation pixel for color image data) ranging from 1–8.

More recently, it is not uncommon for digital image data to be presented in terms of 10–16 bits per sample. Generally, image processing modules are designed to utilize only image data presented in one or two different bit depths, e.g., 1 bit per sample or 8 bits per sample. Because image data is typically encoded in many different formats, each having a different number of bits per sample, it is necessary for image processing modules to use a bit conversion library to perform bit conversion operations among the different encoding formats as needed in a quick and efficient manner.

Heretofore, such bit conversion operations have been performed in image processing systems from an input bit depth to a desired or working bit depth on an individual sample-by-sample basis for each scan line of an image without regard to any periodic relationship between the input bit depth and the output bit depth. In this prior approach, the bits for each individual sample are extracted from a scanline and converted to the desired format through use of some non-optimized conversion algorithm. This individual sample-by-sample conversion method is relatively slow and inefficient due to the fact that input scanlines are often arbitrary in length and the input sample bit depth is generally not in terms of a standard computational data length, i.e., not a byte (8 bits) or some multiple thereof. This increases the number of steps required to extract the subject data bits from the input scanline, and consequently results in use of excessive amounts of valuable computational time.

In modern image processing systems, high speed data processing is essential. As such, it has been deemed desirable to develop a new and improved method and apparatus for performing optimized bit conversion operations in a high speed and efficient manner.

SUMMARY OF THE INVENTION

In accordance with a first aspect of the present invention, a period-based method of converting digital image data for a plurality of pixels from a first bit depth to a second bit depth includes receiving an input scanline of an arbitrary length comprising digital image data for a plurality of input image pixels. Each of the input image pixels is defined at the first bit depth. The input scanline is divided into a plurality of periods each comprising digital image data for a select number of input image pixels. The period is selected so that the image data for the select number of input image pixels exactly comprises m bytes when defined at the first bit depth and exactly comprises n bytes when defined at the second bit depth, wherein m and n are different integers. For each of the periods in succession, the image data for each of the select number of input image pixels is converted from the first bit depth to the second bit depth.

In accordance with another aspect of the present invention, an apparatus for converting digital image data from a first bit depth to a second bit depth includes means for supplying an input scanline of image data representing an plurality of input image pixels at the first bit depth and means for dividing the image data of the input scanline into a plurality of equal periods. Each period comprises image data for a select number of input image pixels. The select number of input image pixels per period is determined based upon the following:

$$p\_in = \frac{input\_block\_size}{gcd(input\_block\_size,\ c)}$$

$$p\_out = \frac{output\_block\_size}{gcd(output\_block\_size,\ x)}$$

Input Pixels $P$/Period $Z = lcm(p\_in,\ p\_out)$ wherein:
input—block_size=the natural word size of the input pixel data;
output_block_size=the natural word size of the output pixel data;
gcd=greatest common denominator operation;
lcm=lowest common multiple operation;
c=the input bit depth; and,
x=the output bit depth.

The apparatus further includes means for accessing the image data of each of the plurality of periods of the input scanline image data and for converting the image data for each input image pixel from the first bit depth to image data for a plurality of output image pixels at the second bit depth. Means for storing the image data in an output scanline is included and stores the image data at the second bit depth for each of the plurality of output image pixels.

In accordance with still another aspect of the present invention, a method of converting digital image data from a first bit depth of c bits per pixel to a second bit depth of x bits per pixel, wherein c and x are integers, includes receiving input image data for a plurality of input pixels at the first bit depth. A plurality of input pixels of said input image are selected and exactly comprise an n byte period so that the image data for the period of input pixels, when converted to output image data having the second bit depth, exactly comprises m bytes of output image data, wherein m and n are integers. The input image data for each of said input pixels in said period is converted from the first bit depth to the second bit depth. The foregoing operations are repeated for all n byte periods of the input image data so that the input image data included in each period is converted from the first bit depth to the second bit depth.

One advantage of the present invention resides in the provision of a new and improved method and apparatus for optimized bit conversion in an image processing system.

Another advantage of the present invention resides in the provision of an image processing system and method for implementing fast and efficient bit conversion to convert digital image data from a first number of bits per sample to a second number of bits per sample using a period-based approach.

Still another advantage of the present invention is the provision of an image processing system wherein a file is used to define which bit conversion operations are to be hard-coded, and which bit conversion operations are to be carried out using a generic conversion method.

A further advantage of the present invention is found in the provision of an image processing system including a code-generator which is invoked for purposes of creating optimized program instructions and an associated bit conversion look-up table implementing bit conversion operations in accordance with the present invention with respect to particular, specified bit conversion operations.

Still other benefits and advantages of the present invention will become apparent to those of ordinary skill in the art upon reading and understanding the present specification.

BRIEF DESCRIPTION OF THE DRAWINGS

The invention may take form in various components and arrangements of components, and in various steps and arrangements of steps. The drawings are only for purposes of illustrating preferred embodiments, and are not to be construed as limiting the invention.

FIG. 4A is a simplified illustration showing the period-based relationship between the input scanline pixel data provided in terms of 2 bits per sample (bit depth=2) and the output scanline pixel data derived from the input data in terms 8 bits per sample (bit depth=8);

FIG. 4B is another simplified illustration showing the period-based relationship between the input scanline pixel data provided in terms of 3 bits per sample (bit depth=3) and the output scanline pixel data derived from the input data in terms of 4 bits per sample (bit depth=4);

DETAILED DESCRIPTION OF PREFERRED EMBODIMENTS

Figure 1:
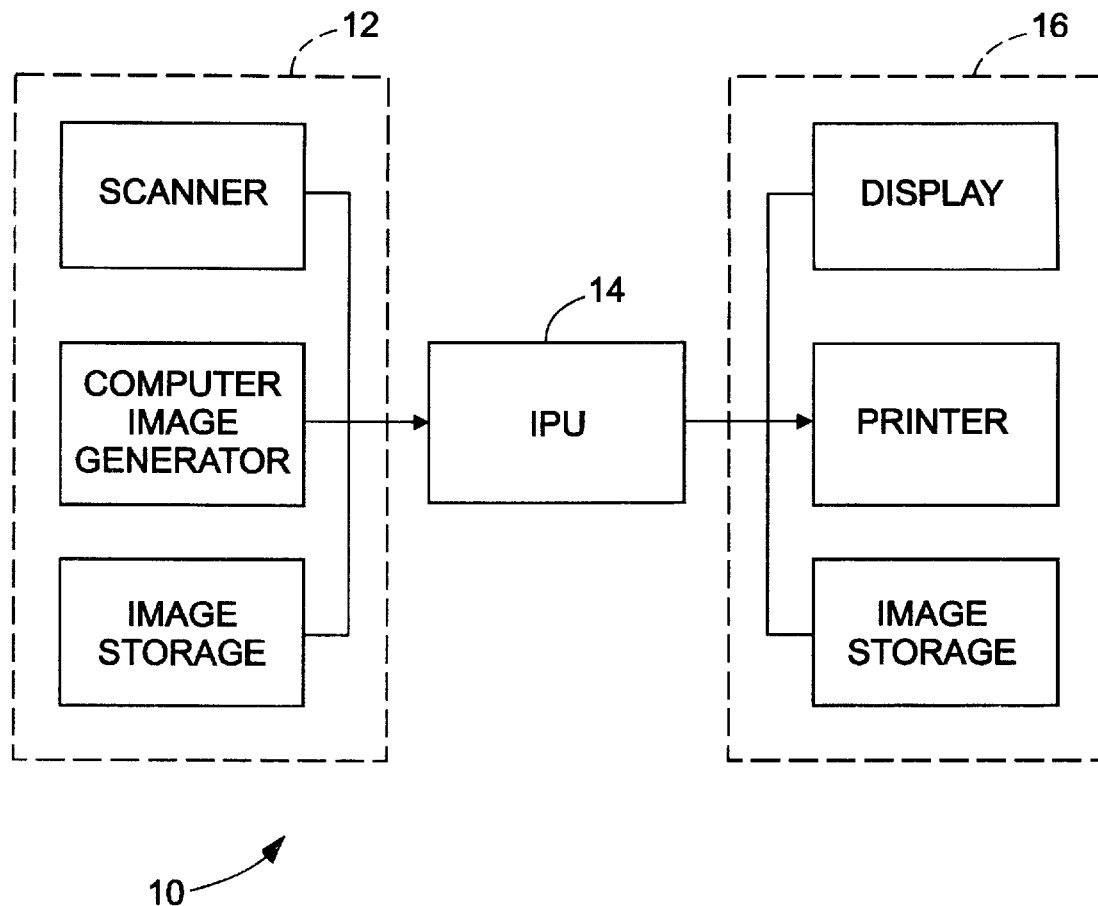
FIG. 1 is a block diagram illustrating a digital image processing system in accordance with the present invention.

Referring now to the drawings where the showings are for purposes of describing preferred embodiments of the invention only and not for purposes of limiting same, a digital image processing system 10 is shown in FIG. 1. An image input terminal 12, comprising a scanner, computer image generator, an image storage device, or the like, derives or delivers digital image data in the form of one or more monochromatic separations, wherein the picture elements or "pixels" of each separation are defined at a depth of "c" bits per pixel where "c" is an integer. Accordingly, each pixel of each separation is defined in terms of "c" bits per "sample" (bit depth=c), and each pixel has some value between full "off" and full "on." When the digital image data-is provided in terms of a single monochromatic separation, the image is monochromatic, for example, so called "black-and-white" image data. On the other hand, when the digital image data is provided in terms of two or more monochromatic separations, a color image results when the data from the separations is combined, for example, red-green-blue (RGB) separations or cyan-magenta-yellow (CMY) separations.

The image signals are input to an image processing unit 14 wherein digital image processing—e.g., scaling, rotation, enhancement, colorization, filtering, and the like—is performed. The image processing unit 14 may be provided by any suitable electronic computing apparatus such as an electronic computer, a dedicated electronic circuit, or any other suitable electronic circuit means. The image processing unit 14 outputs data in a suitable format to an image output terminal 16 such as a digital printer. Suitable apparatus for color digital image input and/or output include the Pixelcraft 7650 Pro Imager Scanner, XEROX DocuTech Production Printing System scanners, the XEROX 5775 digital color copier, the XEROX 5760 and 5765 Majestik digital color copiers, or any other suitable digital scanner and/or copier. Regardless of the depth at which each pixel is defined, the location of each pixel in each separation bitmap is also defined, typically in terms of a row and column.

Figure 2:
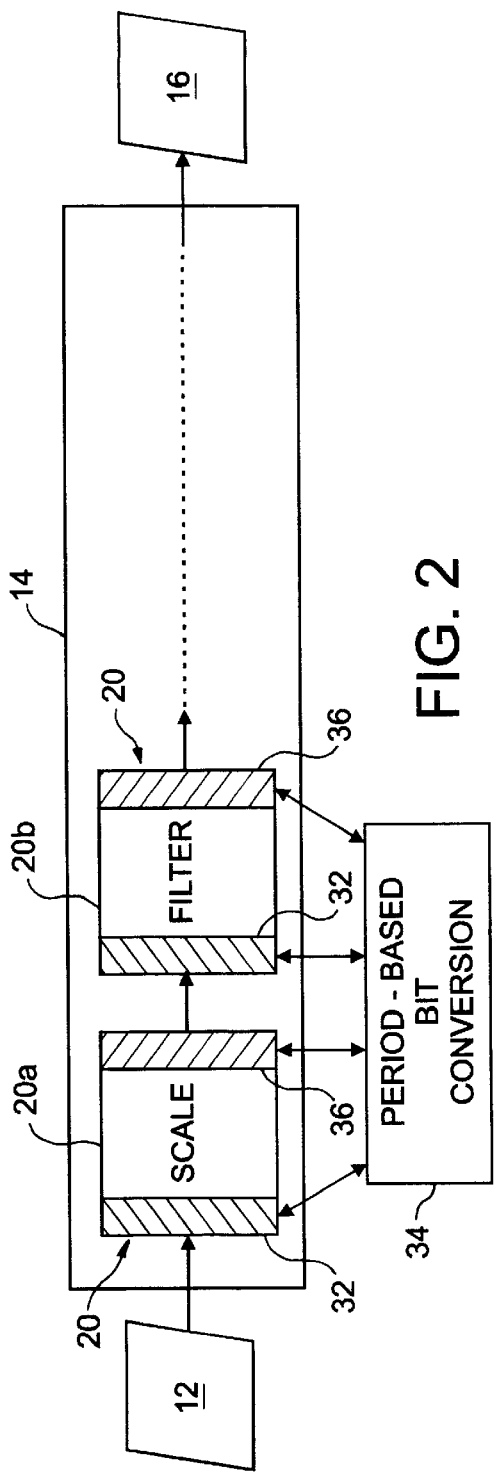
FIG. 2 diagrammatically illustrates the digital image processing system of FIG. 1 implementing bit conversion in accordance with a first embodiment of the present invention.

With reference now to FIG. 2, the image processing unit 14 comprises one or more image processing means or operations 20 for processing the image data supplied by the image input terminal 12. As shown herein, the image processing operations 20, such as an image scale operation 20a and an image filter operation 20b, are carried out in the manner of a pipeline. Of course, the image processing unit 14 may comprise any of numerous other image processing operations 20, and the invention is not meant to be limited to the particular operations 20a,20b illustrated herein.

The image processing operations 20 are programmed to process image data provided at a particular bit depth, e.g., 8 bits per sample, 4 bits per sample, etc. For example, the scale and filter image processing operations 20a,20b are programmed to require image data in terms of a working depth of x and y bits per sample, respectively, where x and y are integers which need not be equal. However, the digital image data is supplied by the image input terminal 12 in terms of c bits per sample, where c is an integer not equal to x or y. Accordingly, at least one of the image processing operations must first cause the image input data supplied by the terminal 12 (or an upstream operation 20) to be converted into the required "working" bit depth for that image processing operation 20.

To that end, each image processing operation 20 includes means for invoking a period-based bit conversion library or means 34 in accordance with the present invention for purposes of converting the data from the supplied bit depth c to the working bit depth x,y (an "unpack" bit conversion operation). Each image processing operation 20 preferably also comprises means for invoking the period-based bit conversion library 34 after it has carried out its image processing function for purposes of converting the image data from the working depth x,y back to the supplied bit depth c (a "repack" bit conversion operation) prior to outputting the data to another image processing operation 20.

More particularly, each image processing operation preferably includes an initial "unpack" bit conversion procedure call 32 or other means for invoking the period-based bit conversion means or operation 34. The unpack procedure call 32 invokes the period-based bit conversion means 34 and supplies the conversion means with the appropriate parameters or arguments as described below so that the conversion means 34 is able to convert the image input data from the supplied encoding of c bits per sample to the working depth of x or y bits per sample in an optimized manner as appropriate for the image processing operations 20a,20b, respectively. Likewise, each image processing operation 20 preferably comprises a final or "repack" bit conversion procedure call 36 or like means for invoking the period-based bit conversion means 34 as required to convert the image data, subsequent to any image processing operation performed thereon by the operation 20, from the working depth x,y for that image processing operation back to the input pixel depth of c bits per sample or some other depth as may be desired.

Figure 3:
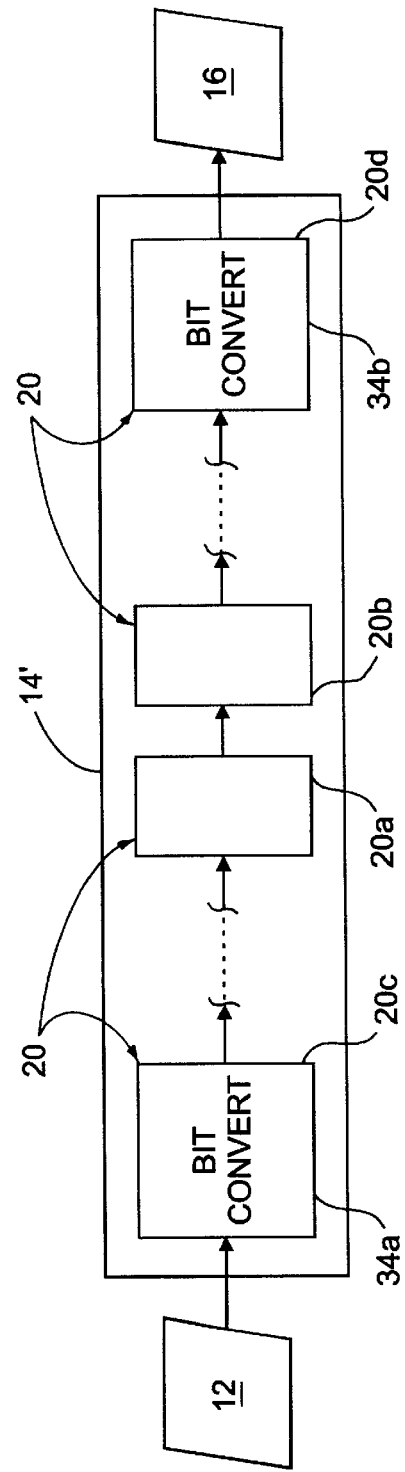
FIG. 3 diagrammatically illustrates the digital image processing system of FIG. 1 implementing bit conversion in accordance with a second embodiment of the present invention.

An alternative configuration for the image processing unit is illustrated in FIG. 3 wherein the image processing unit 14' is the same in all respects to the image processing unit 14, but each image processing operation 20 (such as the scale and filter operations 20a',20b') does not include independent means for invoking a bit conversion library. Instead, the image processing unit 14' comprises an initial or "unpack" bit conversion image processing operation 20c for converting all image data supplied to the image processing unit 14' into a working bit depth x common to all other image processing operations 20 of the image processing unit prior to the input data being supplied to the other image processing operations 20. Similarly, a final or "repack" bit conversion image processing operation 20d is preferably provided for converting the image data, as processed by the previous image processing operations 20, from the working depth x back to the input depth c or some other bit depth as desired.

With reference to FIG. 4A, as one example, image input data is supplied by the image input terminal for each separation bitmap of an image in the form of an image input data scanline 40. The input scanline 40 is typically of an arbitrary length of data bits b. Heretofore, the arbitrary length of the input scanline rendered conversion of the input pixel data contained therein difficult and time-consuming. Each separation pixel or sample P of the input scanline 40 is encoded in terms of an input bit depth c=2 bits b. The first four pixels of the input scanline 40 are identified as P0–P3, respectively. In this example, the image processing operation(s) 20 require the image input data to be supplied in terms of an output bit depth x=8 bits b per pixel or sample P' as represented by the output scanline 50. The mapping of each of the 2 bit depth input pixels P0–P3 to a corresponding 8 bit depth output pixel P0'–P3', respectively, is indicated by the broken lines 42.

It can be seen that, for a given number of pixels P of the input scanline 40, both the input scanline 40 and the output scanline 50 are "byte-aligned"—i.e., a select number of input pixels P exactly fills 1 byte (8 data bits b) or an integer multiple thereof, while the same select number of output pixels P' exactly fills 1 byte (8 bits) or an integer multiple thereof. Of course, the term "byte-alignment" as used herein does not require the input and output pixel data P,P' to fill the same number of bytes. In accordance with the present invention, extraction of the input scanline data for each pixel P, conversion of the extracted input pixel data P to a working pixel depth x, and saving of the converted pixel data P' in the output scanline 50 is greatly simplified when this byte-alignment is achieved. In this example, the alignment occurs for every period Z=1 byte=4 input pixels P of the input scanline 40.

FIG. 4B illustrates another example of the period-based relationship between input data supplied in an input scanline 140 at a bit depth c=3 bits b per sample and output data derived from the input data and saved in an output scanline 150 at a bit depth x=4 bits b per sample. Here, it can be seen that the input and output scanlines 140,150 become byte-aligned for an input scanline period Z=3 bytes=8 input pixels P (corresponding exactly to 4 bytes of the output scanline 150). Thus, data for 8 input pixels (P0–P7) is found in each period Z.

In accordance with the present invention, it is possible to determine the period Z for any desired bit conversion operation to obtain byte-alignment when basic information about the desired bit conversion operation is known. In particular, the period Z and the number of pixels P per period Z are calculated as follows:

$$p\_in = \frac{input\_block\_size}{gcd(input\_block\_size, c)}$$

$$p\_out = \frac{output\_block\_size}{gcd(output\_block\_size, x)}$$

Input Pixels $P/$Period $Z = lcm(p\_in, p\_out)$ wherein:

input_block_size=the natural word size of the input pixel data=the smallest number of bytes (expressed in terms of bits) that will accommodate input pixel data for a pixel P provided at the input pixel depth of c bits per sample;

output_block_size=the natural word size of the output pixel data=the smallest number of bytes (expressed in terms of bits) that will accommodate output pixel data for an output pixel P' provided at the output pixel depth of x bits per sample;

gcd=greatest common denominator operation;

lcm=lowest common multiple operation;

c=the input bit depth; and, x=the output bit depth.

Those skilled in the art will recognize that the period Z will not exceed 8 input pixels P if the input or output bit depths c,x do not exceed 1 byte. The period Z will never exceed 16 input pixels P otherwise.

With particular reference again to FIG. 4A, the foregoing calculations are carried out as follows:

input_block_size = 1 byte = 8 bits output_block_size = 1 byte = 8 bits $c = 2$ $x = 8$ $$p\_in = \frac{8}{gcd(8, 2)} = \frac{8}{2} = 4$$

$$p\_out = \frac{8}{gcd(8, 8)} = \frac{8}{8} = 1$$

Input Pixels $P/$Period $Z = lcm\,(4, 1) = 4$

Period $Z = 4$ pixels $P = 1$ byte

Likewise, with particular reference to FIG. 4B, the calculations result in the following:

input_block_size = 1 byte = 8 bits output_block_size = 1 byte = 8 bits $c = 3$ $x = 4$ $$p\_in = \frac{8}{gcd(8, 3)} = \frac{8}{1} = 8$$

$$p\_out = \frac{8}{gcd(8, 4)} = \frac{8}{4} = 2$$

-continued

Input Pixels $P$/Period $Z = lcm\ (8, 2) = 8$

Period $Z = 8$ pixels $P = 3$ bytes

For any bit conversion operation, once the period Z is calculated, it is possible to perform bit conversion operations for each input pixel P of the input scanline 40,140 in a manner that is highly efficient and optimized relative to simply converting the data for each pixel P of the input scanline 40,140 without regard to any period-based relationship between the input pixel data P and the output pixel data P' that allows for the bit conversion operations to be performed on data that is byte-aligned. In particular, bit conversion operations can be performed for each period Z of the input scanline 40,140 rather than on a sample-by-sample basis. This eliminates the need to test every pixel P to check for the last pixel of the scanline 40,140. Also, as is described in full detail below, because the period Z is known, along with the input bit depth c and the output bit depth x, the byte-alignment allows for the subject bit conversion to hard-coded so that conversion is very fast and efficient, i.e., the known byte-alignment of the data allows optimized operating instructions to be determined in advance for the particular shifting and masking operations required to extract the pixel data P from the input scanline 40,140, index a look-up-table, and save the output pixel data P' in an output scanline 50,150. In prior methods, the particular shifting, masking, and other operations could not be hard-coded, but instead had to be determined at run-time given the uncertainties of the scanline length.

Figure 5A:
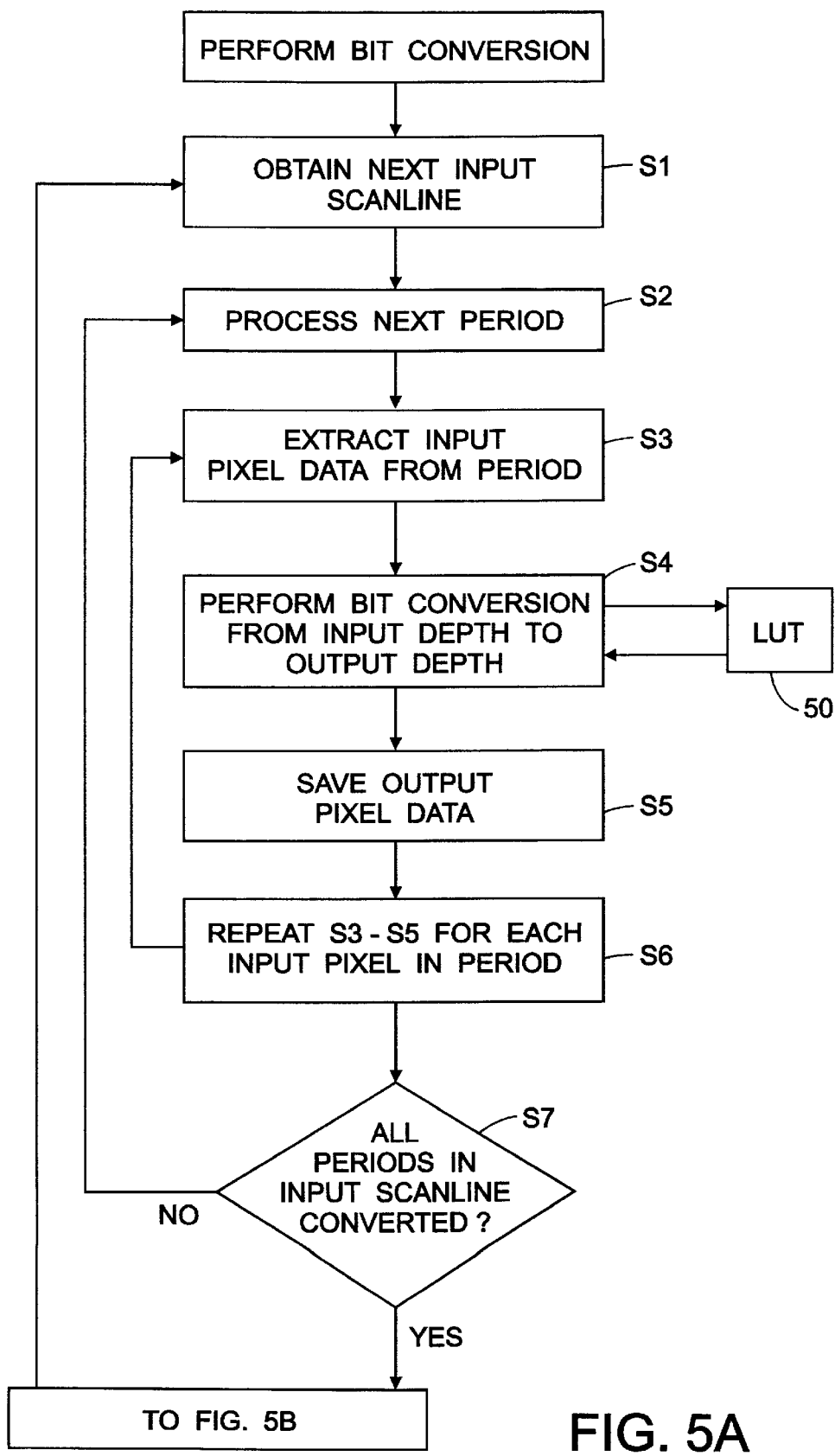
FIGS. 5A and 5B, taken together, are a flow chart illustrating optimized period-based bit conversion in accordance with the present invention (together referred to as FIG. 5); and, FIG. 6 is a flow chart showing the implementation of a code generator to provide optimized bit conversion operating instructions for certain select bit conversion operations, and generic bit conversion operating instructions for all other bit conversion operations.
Figure 5B:
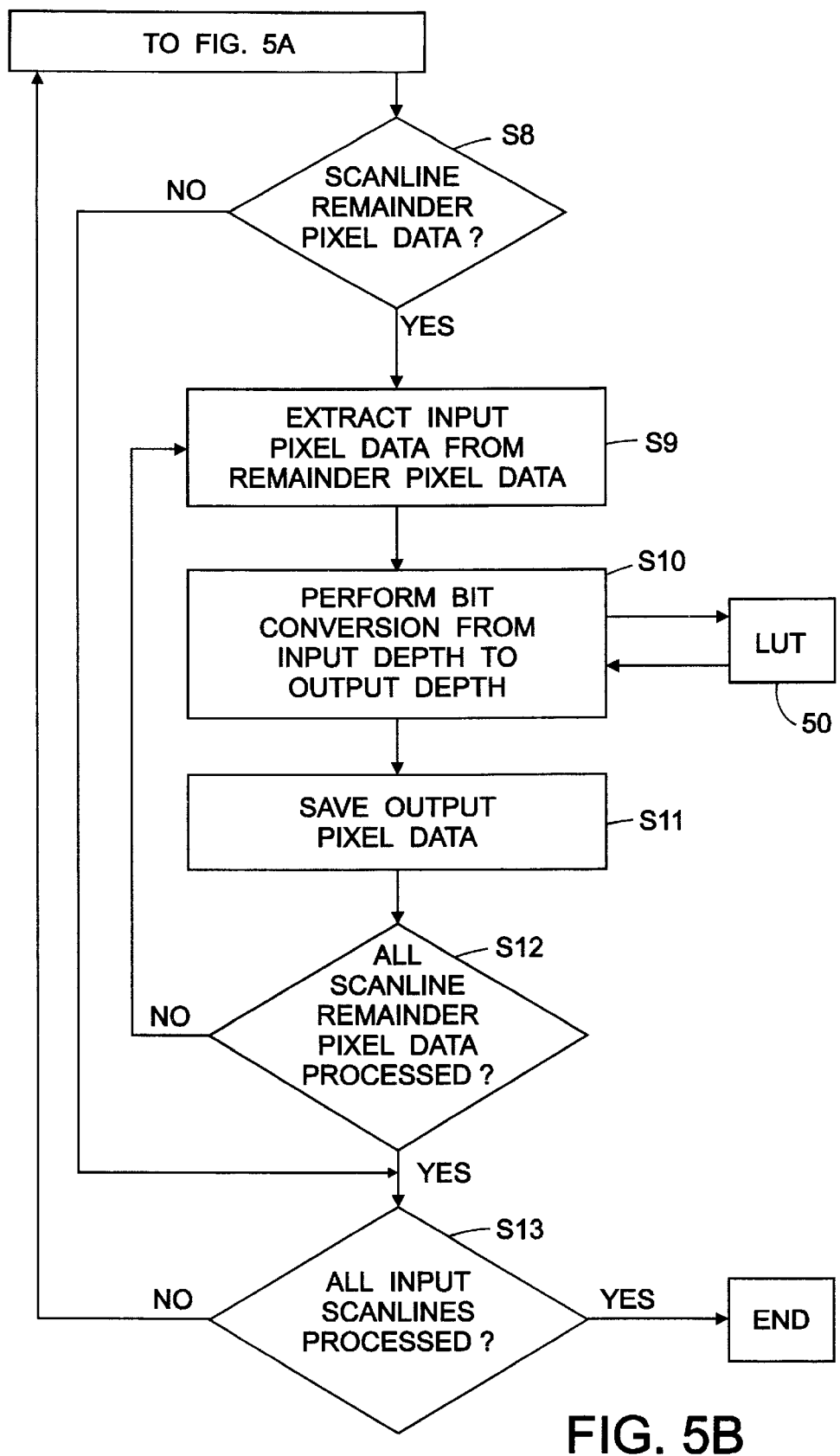

With reference now to FIGS. 5A and 5B, a flow-chart illustrates period-based bit conversion in accordance with the present invention. Those skilled in the art will recognize that variations in the order of operations are possible without departing from the overall scope and intent t0 of the present invention.

A step or means S1 obtains the first or next input scanline 40,140. A step or means S2 processes the next period Z in the scanline 40,140. Individual input pixel data P is extracted from the input scanline 40,140 by step or means S3.

Typically, the data is extracted from a scanline buffer or other memory location by masking—performing an "AND" operation—the relevant buffers with a mask of all binary "1's" and then by shifting the result into the low-order or least significant locations of an output memory location to obtain the actual numerical value P of an input pixel. Step or means S4 performs the conversion of the extracted input pixel data P from its depth of c bits per sample to a depth of x bits per sample by means of a look-up table 50 or other suitable conversion algorithm for mapping input pixel values P from the depth c to output pixel values P' at a depth of x. In the example of FIG. 4A, the look-up table 50 maps the values 0–3 (bit depth c=2) to the values 0–255 (bit depth x=8). Likewise, in the example of FIG. 4B, the look-up table 50 maps the values 0–7 (bit depth c=3) to the values 0–15 (bit depth x=8).

Step or means S5 saves the output pixel data P' in the output scanline 50,150. Based upon the known amount of input pixel data P in the period Z as determined in accordance with the present invention, a step or means S6 repeats steps S3–S5 until all input pixel data P in the period is converted to a working bit depth x.

Thereafter, step or means S7 determines if additional periods Z are present in the input scanline 40,140. If the input scanline 40,140 has unprocessed periods Z, steps S2–S6 are repeated until all periods Z in the input scanline 40,140 have been processed.

Step or means S8 checks for the presence of "remainder" input pixel data P in the input scanline 40,140, i.e., if the number of pixels P in the input scanline 40,140 is not a multiple of the number of pixels P in a period Z, additional pixels P (i.e., remainder pixels) will be found in the input scanline 40,140. If remainder input pixel data P is present in the scanline 40,140, a step or means S9 extracts data P for a remainder pixel, by means of masking and shifting as described above. The extracted remainder input pixel data P is used to index the look-up-table 50 or is input to another suitable conversion algorithm by step or means S10 to convert the remainder pixel data P from an input depth of c bits per sample to pixel data P' at a working depth of x bits per sample, and step or means S11 saves the output pixel data P' in the output scanline 50,150. Step or means S12 determines if all of the remainder pixel data for the input scanline 40,140 has been processed and causes steps S9–S11 to be repeated until all of the remainder pixel data P in the input scanline has been processed. It is noted that the number of remainder pixels P is always less than the number of pixels P in a period Z.

Once all of the remainder pixel data has been processed, or if step or means S8 determines the absence of remainder pixel data, step or means S13 determines if all input scanlines 40,140 have been processed. If not, step or means SI obtains the next scanline from the image input terminal 12 and steps S2–S13 are repeated until every scanline 40,140 supplied by the image input terminal 12 is processed.

Figure 6:
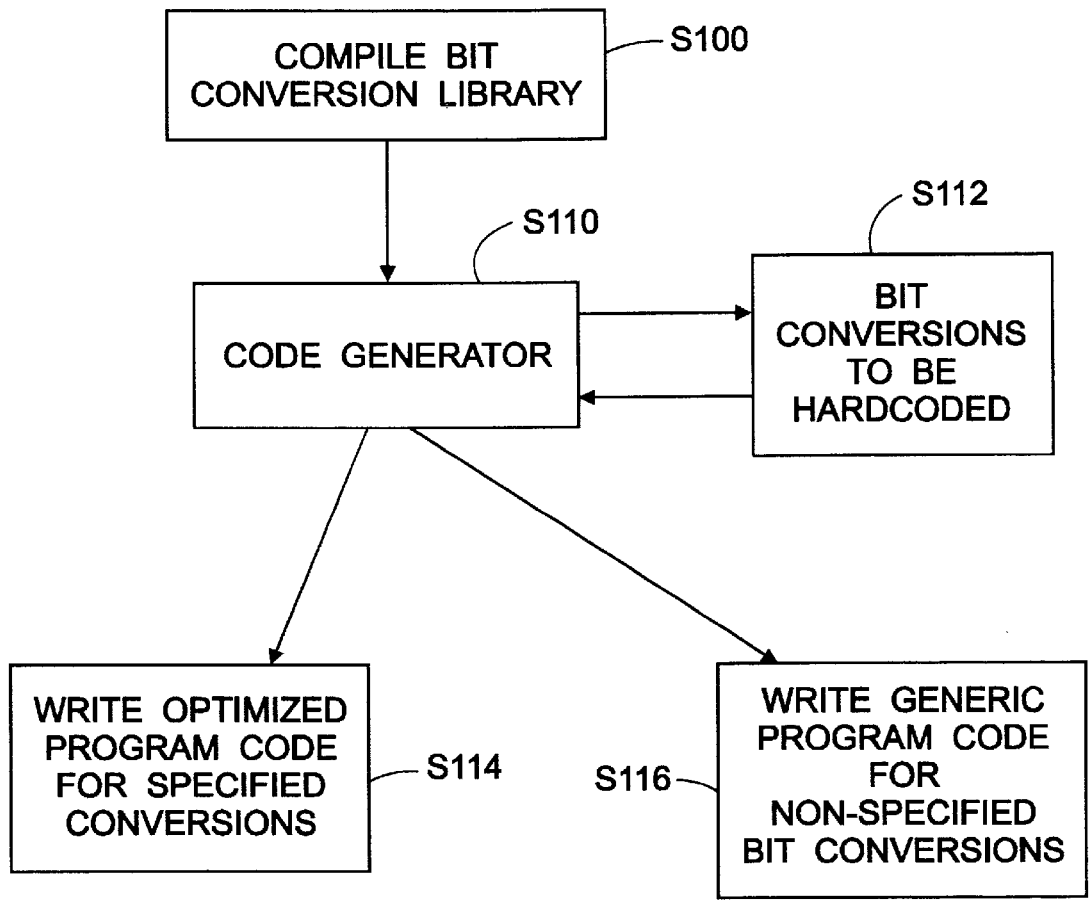

FIG. 6 is a flow-chart illustrating the manner in which the bit conversion library 34 of the present invention accommodates both commonly encountered bit conversion operations and less common bit conversion operations without failing and without inefficient use of the resources of the image processing unit 14,14'. When step or means S100 initially compiles the bit conversion library code, a code generator 110, such as a C source code generator is invoked. The code generator 110 reads a text file 112 which includes a listing of all bit conversion operations that are to be hard-coded, e.g., a 2 bit depth to 8 bit depth conversion, and a 3 bit depth to 4 bit depth conversion. With this information obtained from the text file 112, the code generator 110 writes the source code and the look-up table 50 for those conversion operations listed in the file 112. The code generator 110 is able to write optimized source code S114 because it is able to calculate the period Z for each conversion specified in the file 112. The code generator 110 uses the input block_size, output_block_size, input bit depth c, and output bit depth x as described above to calculate the period Z. Also, the code generator 110 hard-codes all shifting and masking operating instructions for the specified conversions. These specific instructions for each specified conversion are able to be generated and hard-coded by the generator 110 when the bit conversion library is compiled because the use of periods z eliminates uncertainty associated with an arbitrary length input scanline 40,140.

However, to hard-code every possible bit conversion operation would be an inefficient use of the resources of the image processing unit 14,14' because of prohibitively large table sizes (e.g., 65,536 element tables for higher bit encodings such as 16 bits/sample). Therefore, the code generator 110 also writes generic program S116 code for performing all bit conversion operations not specified in the file 112. The generic bit conversion method is also period-based, but does not include hard-coded values for shifting, masking, and for the look-up-table. Accordingly, for those conversions not specified in the file 112, the generic code provides an improved, period-based conversion method that is somewhat less efficient than hard-coded method.

The invention has been described with reference to preferred embodiments. Modifications and alterations will occur to others upon reading and understanding the preceding specification. It is intended that the invention be construed as including all such modifications and alterations insofar as they fall within the scope of the appended claims or equivalents thereof.

Having thus described the preferred embodiments, the invention is claimed to be:

1. A period-based method of converting digital image data for a plurality of pixels from a first bit depth to a second bit depth, said method comprising:
   a) receiving an input scanline of an arbitrary length comprising digital image data for a plurality of input image pixels, each of said plurality of input image pixels defined at a first bit depth;
   b) dividing the input scanline into a plurality of periods and a remainder with each of said plurality of periods comprising digital image data for a select number of input image pixels and said remainder comprising digital image data for less than said select number of input image pixels, said select number of input image pixels defining a period selected so that the image data for the select number of input image pixels exactly comprises m bytes when defined at the first bit depth and exactly comprises n bytes when defined at a second bit depth, wherein m and n are different integers;
   c) for each of said plurality of periods in succession, converting the image data for each of said select number of input image pixels from the first bit depth to the second bit depth; and,
   d) converting the image data defining said remainder from the first bit depth to the second bit depth.

2. A period-based method of converting digital image data for a plurality of pixels from a first bit depth to a second bit depth said method comprising:
   a) receiving an input scanline of an arbitrary length comprising digital image data for a plurality of input image pixels, each of said plurality of input image pixels defined at the first bit depth;
   b) dividing the input scanline into a plurality of periods each comprising digital image data for a select number of input image pixels, said period selected so that the image data for the select number of input image pixels exactly comprises m bytes when defined at the first bit depth and exactly comprises n bytes when defined at a second bit depth wherein m and n are different integers and wherein said select number of input image pixels in said period is determined according to the following:

$$p\_in = \frac{input\_block\_size}{gcd(input\_block\_size, c)}$$

$$p\_out = \frac{output\_block\_size}{gcd(output\_block\_size, x)}$$

Input Pixels $P$/Period $Z = lcm(p\_in, p\_out)$ input_block_size=the natural word size of the input pixel data,
output_block_size=the natural word size of the output pixel data,
gcd=greatest common denominator operation,
lcm=lowest common multiple operation,
c=the input bit depth, and,
x=the output bit depth; and, c) for each of said plurality of periods in succession, converting the image data for each of said select number of input image pixels from the first bit depth to the second bit depth.

3. The method of converting digital image data as set forth in claim 2, wherein the input block_size is one of 8 bits and 16 bits in length and wherein the output_block_size is one of 8 bits and 16 bits in length.

4. The method of converting digital image data as set forth in claim 2, wherein said step of converting the image data for each of said input image pixels from the first bit depth to the second bit depth comprises:
   sequentially extracting the image data for each of said input image pixels; and,
   indexing a look-up table with the extracted image data to obtain output image data from said look-up table corresponding to the extracted image data at the second bit depth.

5. The method of converting digital image data as set forth in claim 2, further comprising:
   d) converting image data for each remainder input image pixel not included in one of the plurality of periods.

6. The method of converting digital image data as set forth in claim 1, further comprising:
   before step a), reading an input file comprising a list of specified bit conversion operations;
   for each of said specified bit conversion operations, writing bit conversion instructions for calculating the number of input image pixels in each of said periods, for extracting image data for each input image pixel from each period, and, for accessing a look-up table to obtain output image data at the second bit depth for each input image pixel.

7. An apparatus for converting digital image data from a first bit depth to a second bit depth, said apparatus comprising:
   means for supplying an input scanline of image data representing an plurality of input image pixels at the first bit depth;
   means for dividing the image data of the input scanline into a plurality of equal periods each comprising image data for a select number of input image pixels, the select number of input image pixels per period determined according to the following:

$$p\_in = \frac{input\_block\_size}{gcd(input\_block\_size, c)}$$

$$p\_out = \frac{output\_block\_size}{gcd(output\_block\_size, x)}$$

Input Pixels $P$/Period $Z = lcm(p\_in, p\_out)$ wherein:
   input_block_size the natural word size of the input pixel data,
   output_block_size=the natural word size of the output pixel data,
   gcd=greatest common denominator operation,
   lcm=lowest common multiple operation,
   c=the input bit depth, and,
   x=the output bit depth;
   means for accessing the image data of each of said plurality of periods of said input scanline image data and for converting the image data for each input image pixel from the first bit depth to image data for an output image pixel at the second bit depth; and, means for storing the image data for each output image pixel in an output scanline at the second bit depth.

8. The apparatus as set forth in claim 7, further comprising:

means for accessing input image data for at least one remainder input image pixel of said input scanline not included in said plurality of periods and for converting said input image data for said at least one remainder input image pixel from the first bit depth to output image data the second bit depth; and, means for storing the output image data in the output scanline.

9. The apparatus as set forth in claim 7, further comprising:

means for accessing an input file including a list of select bit conversion operations;

means for generating specific operating instructions for each of the select bit conversion operations; and, means for generating a look-up table for each of said select bit conversion operations for interrelating input image data having the first bit depth to output image data having the second bit depth.

10. The apparatus as set forth in claim 9, wherein said means for generating specific operating instructions for each of the select bit conversion operations generates at least operating instructions for performing required shifting and masking operations to extract image data for said plurality of input image pixels from said input image scanline.

11. A method of converting digital image data from a first bit depth of c bits per pixel to a second bit depth of x bits per pixel, wherein c and x are integers, said method comprising:

a) receiving input image data for a plurality of input pixels at the first bit depth;

b) selecting a plurality of input pixels of said input image exactly comprising an n byte period so that said image data for said period of input pixels, when converted to output image data having the second bit depth, exactly comprises m bytes of output image data, wherein m and n are integers and wherein said period of n bytes of said input image data is determined according to the following:

$$p\_in = \frac{input\_block\_size}{gcd(input\_block\_size, c)}$$

$$p\_out = \frac{output\_block\_size}{gcd(output\_block\_size, x)}$$

Input Pixels $P$ / Period $Z = lcm(p\_in, p\_out)$ input_block_size=the natural word size of the input pixel data, output_block_size=the natural word size of the output pixel data, gcd=greatest common denominator operation, lcm=lowest common multiple operation, c=the input bit depth, and, x=the output bit depth c) converting the input image data for each of said input pixels in said period from the first bit depth to the second bit depth; and, d) repeating steps b)–c) for all n byte periods of said input image data so that the input image data included in each period is converted from the first bit depth to the second bit depth.

12. The method of converting digital image data as set forth in claim 11, further comprising:

e) for all remainder input image data not included in one of said n byte periods, converting said remainder input image data from said first bit depth to said second bit depth.

13. The method of converting digital image data as set forth in claim 11, wherein said input_block_size and said output_block_size are each one of 8 bits and 16 bits.

* * * * *